W. DILLON.
Potato Digger.

No. 108,117.  Patented Oct. 11, 1870.

Witnesses:
A. Bennerkendorf
D. S. Mabee

Inventor:
W. Dillon
Per
Attorneys.

United States Patent Office.

WILLIAM DILLON, OF SONOMA, CALIFORNIA.

Letters Patent No. 108,117, dated October 11, 1870.

IMPROVEMENT IN POTATO-DIGGERS.

The Schedule referred to in these Letters Patent and making part of the same.

*To all whom it may concern:*

Be it known that I, WILLIAM DILLON, of Sonoma, in the county of Sonoma and State of California, have invented a new and useful Improvement in Potato-Digger; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved machine for digging potatoes, which shall be simple in construction, strong, durable, effective in operation, and easily adjusted to work at a greater or lesser depth in the ground, as may be required; and It consists in the construction and combination of the various parts, as hereinafter more fully described.

A is the beam, to the forward end of which the clevis B is attached.

C is the gauge-wheel, the axle of which is attached to the lowest part or bow of the bent or U-shaped bar D, through the arms of which are formed several holes, to receive the bolts, by which the said bar is secured to the forward part of the beam A, so that the gauge-wheel C may be easily raised and lowered, to regulate the depth at which the machine works in the ground.

The rear end of the beam A is securely bolted to the cross-beam E.

Figure 1:
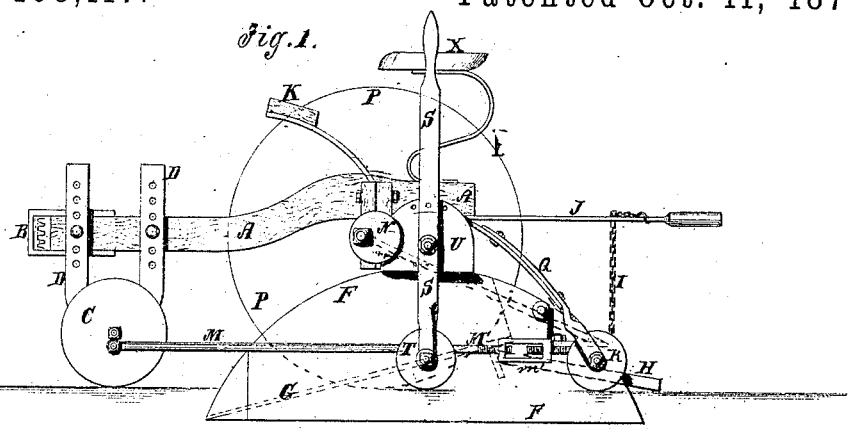
Figure 1 is a side view of my improved potato-digger.

F are the land-sides, the lower edges of which are made straight, and the upper edges of which are made curved, as shown in fig. 1.

The land-sides F, at the middle parts of their upper edges, are securely attached to the beam E, near its ends, as shown in the drawing.

G is the plow-plate or scoop, the side flanges of which are securely connected with the forward parts of the land-sides F, and which is set in an inclined position, as shown in dotted lines in fig. 1, so that the soil and potatoes may readily slide up it, and drop from its rear upper edge as the machine is drawn forward.

Figures 2, 4:
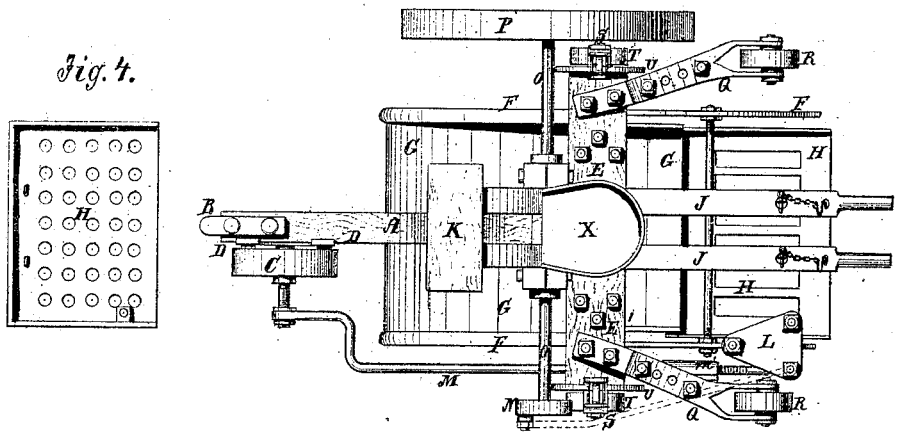
Figure 2 is a top view of the same.
Figure 4 is a detail view of a modified form of the screen.

Beneath the rear edge of the plate G is suspended the screen H, the openings in which may be made in the form of long narrow slots, as shown in fig. 2, or in the form of round holes, as shown in fig. 4.

In either case, the openings should be made sufficiently large to allow the soil to pass through freely, and at the same time so small that the potatoes cannot pass through.

Figure 3:
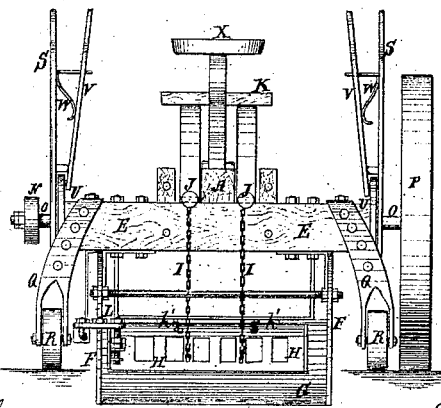
Figure 3 is a rear view of the same.

The forward edge of the screen H is suspended loosely from the rear part of the plow-plate G, by links or double hooks and eyes $k'$, as shown in fig. 3, so that it may be shaken, to facilitate the escape of the soil through its openings.

The rear part of the screen H is suspended by means of chains I, the lower ends of which are secured to the said screen, and upper parts of which pass up through holes in the rear parts of the supporting bars J, where they are adjustably secured in place by pins or keys passed through the links of said chains, and resting upon the upper sides of the said bars, as shown in fig. 2. This manner of attachment allows the inclination of the screen to be adjusted as the character of the soil may require.

The supporting-bars J are securely bolted to the cross-beam E, and their forward ends may be bent upward to support the foot-board K.

If desired the foot-board K may be supported by separate supports.

L is a triangular plate or lever, pivoted at one angle to the land-side F. Another angle of the plate L is pivoted to a bolt or arm, rigidly attached to the screen H. The third angle of the plate L is pivoted to the end of the pitman M, the other end of which is pivoted to the crank-pin of the gauge-wheel C, as shown in figs. 1 and 2.

The pitman M may be made in two parts, connected by a right-and-left-hand nut, or by a swiveled nut, $m$, so that the throw or shake of the screen H may be regulated as desired.

If desired, the pitman M may be made short, and pivoted to the crank or crank-wheel N, attached to the end of the shaft O, which revolves in bearings attached to the cross-beam E, and to the other end of which is attached the drive-wheel P, which receives motion from contact with the ground. In this case, a drive-wheel, P, of a different diameter, must be used for each difference in depth at which the machine works in the ground.

Q are arms, curved outward and downward, the upper ends of which are securely bolted to the end parts of the cross-beam E, and to the lower ends of which are pivoted the small wheels R.

The arms Q are made in two parts, which overlap each other, and are adjustably bolted to each other, by bolts passing through one or the other of the series of holes formed through the said parts, so that the said arms may lengthened and shortened, as may be desired.

S are arms, having small wheels T pivoted to their lower ends, and which are pivoted to the ends of the cross-beam F, or to plates U, attached to said ends.

To projections formed upon or attached to the inner sides of the arms S are pivoted the lower ends of the levers V, the upper parts of which move back and forth upon guide-arms attached to the upper parts of the arms S.

The upper ends of the levers V are held away from the arms S by springs W, attached to the said arms S, and pressing against the said levers V, as shown in fig. 3.

To the lower ends of the levers V are attached catch-pins, which pass into holes formed in the upwardly-projecting edges of the plates U, attached to the ends of the cross-beam E, as shown in figs. 1 and 3, so as to hold the said arms S securely in any position into which they may be adjusted, and so as to enable the said arms to be readily adjusted as required.

X is the driver's seat, which is connected with and supported from the rear part of the beam A, or from the cross-beam E.

Having thus described my invention,

I claim as new and desire to secure by Letters Patent—

1. The combination of the beam A, gauge-wheel C, adjustable bent bar D, cross-beam E, landsides F, plow-plate or scoop G, suspended screen H, adjustable chains I, bars J, triangular plate or lever L, and adjustable pitman M, with each other, substantially as herein shown and described, and for the purpose set forth.

2. The combination of the beam A, gauge-wheel C, adjustable bent bar D, cross-beam E, land-sides F, plow-plate or scoop G, suspended screen H, adjustable chains I, bars J, triangular plate or lever L, adjustable pitman M, adjustable arms Q, wheels R, pivoted arms S, wheels T, catch-levers V, and springs W, with each other, substantially as herein shown and described, and for the purpose set forth.

3. The combination of the beam A, gauge-wheel C, adjustable bent bar D, cross-beam E, land-sides F, plow G, suspended screen H, adjustable chains I, bars J, triangular plate or lever L, pitman M, crank or crank-wheel N, shaft O, and drive-wheel P, with each other, substantially as herein shown and described, and for the purpose set forth.

WILLIAM DILLON.

Witnesses:
  G. T. PAULI,
  F. ALBERT PAULI.